United States Patent [19]

Quan

[11] Patent Number: 4,682,015

[45] Date of Patent: Jul. 21, 1987

[54] LOW POWERED HIGH AMBIENT LIGHT BAR CODE READER CIRCUIT

[75] Inventor: Ronald Quan, Cupertino, Calif.

[73] Assignee: Hewlett-Packard Company, Palo Alto, Calif.

[21] Appl. No.: 709,472

[22] Filed: Mar. 7, 1985

[51] Int. Cl.[4] .............................................. G06K 7/10
[52] U.S. Cl. ..................................... 235/472; 235/454
[58] Field of Search ................................ 235/472, 454

[56] References Cited

U.S. PATENT DOCUMENTS 3,925,639  12/1975  Hester ................................... 235/472
3,947,817   3/1976  Reqna ................................... 235/472
3,991,299  11/1976  Chadima ............................... 235/472

Primary Examiner—Harold I. Pitts
Attorney, Agent, or Firm—James M. Williams

[57] ABSTRACT

A low power bar code detection circuit is provided. The detection circuit, because of the sensitivity of its internal amplifiers, is capable of reading reflected bar code images even in high ambient light, for example, in sunlight. This sensitivity is accomplished by having a high gain of the photodetected bar code signal by amplifying it with a transresistance preamplifier. The low power is accomplished by using a pulse-modulated light source for producing reflected images and having intermediate amplifier stages of the detection circuit conduct only at the peak amplitudes of the detected image signal.

8 Claims, 2 Drawing Figures

LOW POWERED HIGH AMBIENT LIGHT BAR CODE READER CIRCUIT

BACKGROUND AND SUMMARY

Bar codes are areas of readable printed matter consisting of vertical bars and spaces whose varying widths encode sets of characters, including numbers. These bar codes are used for product identification extensively in many industries, particularly the grocery and food processing industry. With these bar codes designating the products, the products can be easily identified electronically both in warehouses and in commericial outlets. Furthermore, a central computer can automatically price these products at a check-out counter once they are identified. The ease and speed these bar codes introduce to a commercial transaction greatly encourage their wide-spread use. Coupled with the wide-spread use of bar codes, however, is the need for bar code readers that are accurate, that is, equally sensitive with varying ambient light, and low-powered. A typical bar code reader in the prior art, unfortunately, do not have both low-power consumption and accuracy.

A bar code wand reader typically is a device which uses a light source directed from within to create an imaged spot on the target bar code tag. Along with the light spot, an internal photodetector is imaged. This imaged photodetector senses the presence or absence of reflected light from the bar code as the spot moves across spaces and bars. The output of the bar code reader then is processed and decoded, usually by some processor, and the information derived from the processor is then put to use. The accuracy of the information, as can be readily seen, is directly dependent on the sensitivity of the bar code reader. For example, in high ambient light, the bar code reader must be sensitive enough to discern the imaged spot light from the ambient light in order to maintain efficient reolution for the decoding process. Unfortunately in the prior art, a bar code reader generally changes resolution with the amount of ambient light; the greater the ambient light is, the less resolution the bar code reader has. In fact, the typical prior art bar code wand reader overloads in the sun and is then not able to read a bar code. The present invention overcomes this limitation of the prior art. In addition, the present invention requires very low power, typically a tenth of the power consumed by prior art bar code readers.

In the preferred embodiment of the invention, a light source of pulse-modulated light of no more than 3% duty cycle is used to create the image spot. The image spot, comprising of reflections of pulse-modulated light, is received by a photodetector diode, which, in turn, produces an image signal in response thereto. This received image signal, or detected bar code signal, is then amplified by an initial stage and is passed through a high pass filter to remove base band bar code frequencies caused by ambient light. It is again amplified and filtered in a second stage comprising a wideband, low power amplifier. The output from the second stage is peak-detected by a buffer transistor detector rather than a diode as in the prior art; it would otherwise unduly load the circuit. The detected image signal is then finally digitized. Before digitizing the peak-detector output, the signal can be further filtered through a low pass filter for a smoother signal. The digitized output signal from the digitizer stage represents the detected bar code signal and is the final output from the the bar code reader circuit. This output signal can then be further processed for information retrieval.

DETAILED DESCRIPTION

Figure 1:
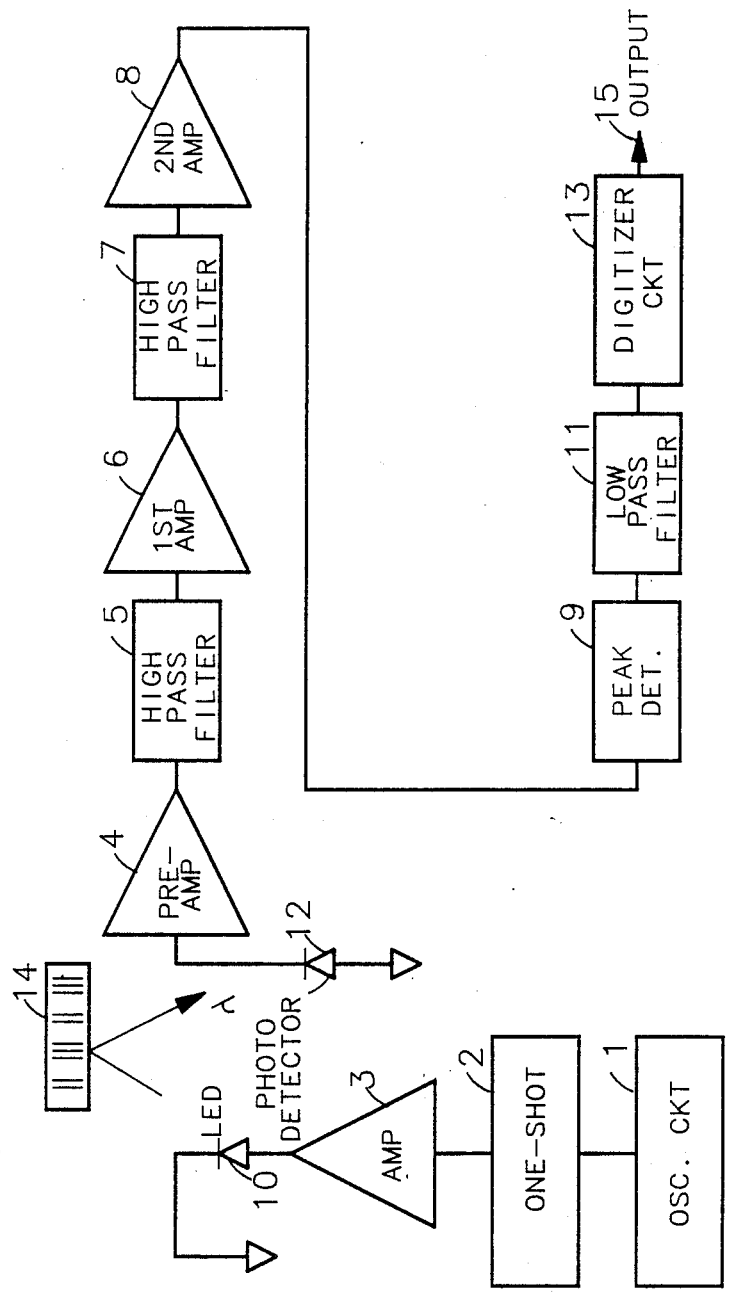
FIG. 1 shows a block diagram of the preferred embodiment of the invention.

In FIG. 1, a light emitting diode (LED) 10 is driven at about 30 ma peak at approximately 3% duty cycle. If the duty cycle of this modulation is 1 microsecond long, then the modulation frequency is approximately 30 KHz. This results in approximately 1 ma average current through the LED 10. When the light is directed to a printed bar code 14, it is reflected as 30 KHz 1 microsecond pulses into a photodetector diode (PD) 12. The PD 12 produces an image signal in response to the detected light reflections. This image signal from the PD 12 is then connected to the input port of a high dynamic range preamplifier 4. A high pass filter 5 is connected to the output port of the preamplier 4 to remove base band bar code frequencies in the range of d.c. to 5 KHz from the detected image signal. These low frequency signals originate, for example, from reflections due to ambient natural and artificial light and, in particular, light modulated by power lines. The image signal filtered by the high pass filter 5 is further amplified in a second stage 6, and is then passed through another high pass filter 7 for further rejection of base band bar code frequencies and power components. It is then amplified again by a third stage 8 and peak detected by a transistor detector 9. The peak-detected signal then passes through a two-pole, 5 KHz low pass filter. This low pass filter 11 is used to recover bar code frequencies and reject components above 5 KHz, for example, components of the 30 KHz modulation rate. The output signal from the low pass filter 11 is then digitized by a comparator circuit 13, which slices, or digitizes, the detected analog bar code signal accordingly into a digital output signal.

Figure 2:
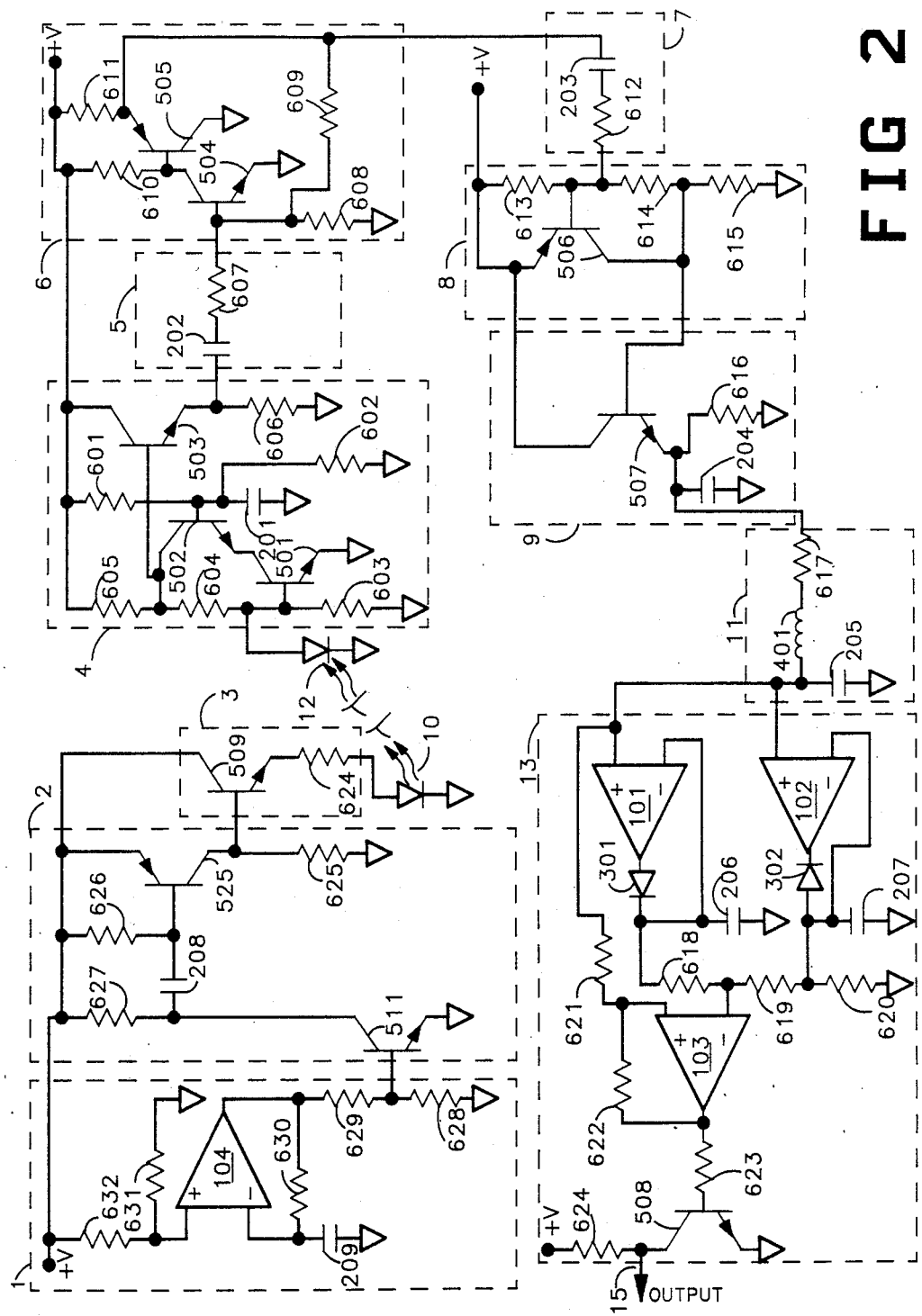
FIG. 2 shows a detailed schematic of the preferred embodiment of the invention.

In FIG. 2, the preferred embodiment of the invention has an oscillator circuit 1 to provide the modulation for the imaging light 10. Forming this oscillator circuit 1 are an operational amplifer 104, resistors 632, 631, 630 and a capacitor 209. Resistors 631, 632 provide bias for the amplifer 104 at its positive input port and resistor 630 and capacitor 209 provide phase shift to the amplifer 104 to cause the circuit to oscillate. To decrease the transition time of the output signal of the amplifer 104, resistors 627, 628, 629 and a transistor 511 are connected to the output port of the amplifier 104. The output signal from the collector of the transistor 511 is a 30 KHz oscillation signal. This oscillation signal is then connected to the input port of a one-microsecond one-shot circuit 2 comprising resistors 625, 626, a capacitor 208, and a transistor 510. A transistor 509 connected to the output of the one-shot transistor 510 acts as a drive amplifier 3 for the LED 10, to which it 510 is connected at its emitter, and a resistor 624 connected as an additional emitter load to the drive amplifier 510 acts as a current limiting resistor for the LED 10. Although the oscillator circuit 1 and one-shot circuit 2 are shown to have separate components, these circuits 1, 2 can be made into a simplifed integrated CMOS circuit comprising a dual one-shot circuit with two resistors and two capacitors.

For maximum gain, the detected output signal from the PD 12 is connected to a transresistance preamplifier 4 composed of two transistors 501, 502, where it is amplified. The voltage amplitude of the output signal from the collector of transistor 502 is dependent on an input resistor 604 connected to the base of transistor 501; therefore to increase gain, the input resistor 604 is made large, for example, greater than 100 kohms. The pair of transistors 501, 502 form a cascode common emitter preamplifier 4. This cascode preamplifier 4 has a wide bandwidth, because it avoids shunting the collector-base capacitances of transistor 501 across the input resistor 604. In conventional common-emitter amplifiers, the shunting reduces high frequency response necessary to recover a 1 microsecond pulse. A bias resistor 603 connected at the base of transistor 501 sets the collector voltage of transistor 502 higher than the base voltage of transistor 502. In this way, the transistor 502 does not saturate. To ensure that transistor 502 acts as a grounded base amplifier, a capacitor 201 is connected across its base and ground for bypassing a.c. signals to ground. Bias resistors 601, 602 for transistor 502 are chosen to provide a base voltage for transistor 502 such that both cascode preamplifier transistors 501, 502 remain in the active region.

For buffering the output port of the cascode preamplifier 4, an emitter follower amplifier comprising a transistor 503 and a bias resistor 606 is connected to the collector of transistor 502. The emitter follower amplifier transistor 503 also increases current drive for the next stage. Following this stage, the output signal from the collector of transistor 503 passes through a first high pass filter 5. This first high pass filter 5 is composed of a resistor 607 and a capacitor 202 connected in series to the emitter of transistor 503. Connected to the output of this high pass filter 5 is the first amplifier stage 6 formed by transistors 504, 505 and resistors 607-611. This amplifier stage 6 is an inverting gain amplifier with gain set by resistors 609 and 607. A base resistor 608 connected to transistor 504 sets the bias point for the collector of the transistor 504. A load resistor 610 acts as the collector load for transistor 504, and load resistor 611 as emitter load for transistor 505. Together, these transistors 504, 505 amplify the detected signal further before it is passed through a second high pass filter 7 comprising a resistor 612 and a capacitor 203, where it is again filtered.

To conserve power consumption, an amplifier stage 8 is formed next with a transistor 506 and resistors 612-615. In the preferred embodiment, the transistor 506 is chosen to be a pnp transistor; because of this, the collector of the transistor 506 can swing almost up to the supply voltage, thus providing a maximum amplitude for the detected signal. Because the output signal is obtained from the collector, this amplifier stage 8 is an inverting gain amplifier, and the gain is set by resistors 612, 614 connected to the base of the amplifier transistor 506. The base resistor 613 of transistor 506 in series with resistor 614 sets the operating voltage of the collector of transistor 506. Transistor 506 has a load resistor 615 connected to its collector. It 615 acts as the output port for the amplifier stage 8. A transistor 507 and a resistor 616 and capacitor 204 combination are connected to this output port for buffered peak modulation detection. Less current is needed to drive this modulation detector circuit 9 using a transistor 507 than one using a detector diode, because the input signal, which is conected to the base of the transistor 507, sees a relatively high impedance. If a detector diode is used at this point, as is typically done in prior art circuits for peak detection, the diode would load down transistor 506 by making transistor 506 drive the peak holding circuit capacitor 204. The value of resistor 616 is chosen to ensure that the modulation detector circuit 9 recovers the higher frequency bar code data properly by discharging the holding capacitor 204 sufficiently after every cycle, for example, 30 KHz as in the illustrated embodiment of the invention.

The detected signal emanating from the detector 507 is coupled to a low pass filter 11 comprising a resistor 617, an inductor 401, and a capacitor 205. This filter 11 smoothes out the modulation frequency components in the detected bar code signal. The output port of the low pass filter 11, capacitor 205, is connected to the final stage 13, a digitizing circuit. The input port of the digitizing circuit 13 comprises a pair of amplifiers 101, 102. The first amplifier 101, along with its peripheral components, a diode 301 and a capacitor 206, tracks and holds the positive peak of the detected bar code signal. The second amplifier 102, along with its peripheral components, a diode 302 and a capacitor 207, tracks and holds the peak output of the negative part of the detected bar code signal. Resistors 618, 619 are used to sum the positive and negative parts of the detected bar code signal and to weight the parts to a value intermediate to the positive and negative peak voltages at the low pass filter 11. A resistor 620 is connected between one of the summing resistors 619 and ground to ensure that the voltage at the negative input port of a third amplifier 103, to which the summed positive and negative parts are connected, is always less than that at its positive input port during long white code. The third amplifier 103 compares the weighted parts with the detected bar code signal and slices the detected signal accordingly. So that small amounts of noise that may be present at the output of the low pass filter can be ignored, a pair of resistors 621, 622 form a small amount of hysteresis on the detected bar code signal. Finally, a buffer transistor 508 is connected to the output of the third amplifier through a resistor 623 to serve as a TTL/CMOS open collector output port. An optional resistor 624 may be connected to the collector of transistor 508 to serve as a pull-up resistor for the transistor.

The preferred embodiment, in comparison to the circuits in the prior art, achieves bar code detection with very low power consumption. This conservation of power is accomplished by the first amplifier stage 6 comprising transistors 504 and 505 and is further maintained by the subsequent amplifier stage 8. Since the signal entering the base of transistor 504 is positive-going, transistor 504 conducts its peak currents on positive-going pulses, which, in the illustrated embodiment, are 1 microsecond, 30 KHz pulses. Conversely, transistor 505 conducts its peak currents in the negative direction, because the output port of transistor 504, to which the base of transistor 505 is connected and driven, inverts the signal entering the base of transistor 504. Transistor 506 inverts the negative-going pulses from the emitter follower 505. This means that the peak currents through transistor 506 occur when the positive-going pulses rise across the collector load 615 of transistor 506. Again, this means that transistor 506 conducts its peak currents only during the pulse. Because the pulses in the preferred embodiment is low in duty cycle, the average power of the pulses is also very low in comparison to the prior art.

What is claimed is:

1. A low power bar code reader detection circuit comprising:

an oscillation circuit for driving a light-emitting device, having a low duty cycle and high frequency, to provide a pulse-modulated light source;

a photodetector for detecting reflected pulse-modulated light images from a bar code and for providing an image signal in response thereto;

a plurality of amplifier stages connected to the photodetector for amplifying the image signal, wherein the amplifier stages conduct substantially only upon peak amplitudes of the image signal, a peak modulation detector means connected to the final stage of the plurality of amplifier stages for demodulating and holding the peak amplitude of the amplified image signal, the peak modulation detector means demodulating peak amplitude without the means of a detector diode; and a digitizing circuit connected to the peak modulation detector means, the digitizing circuit having the detected image signal as an input signal for digitizing.

2. The low power bar code reader detection circuit as in claim 1, wherein the peak modulation detector means comprises an emitter follower stage having a capacitor for holding the peak amplitude.

3. The low power bar code reader detection circuit as in claim 2, wherein the plurality of amplifier stages comprises a stage which conducts only at peak amplitudes of the image signal.

4. The low power bar code reader detection circuit as in claim 2, wherein the plurality of amplifier stages comprises:

(a) a preamplifier stage comprising a transresistance amplifier of a first npn common-emitter transistor cascoded at its collector to a second npn transistor and an npn transistor emitter-follower buffer connected to the output port of the transresistance amplifier;

(b) a first amplifier stage coupled to the preamplifier stage through a first high pass filter, the first amplifier stage comprising an npn common-emitter transistor having a pnp common collector transistor coupled to its collector; and (c) a second amplifier stage coupled to the first amplifier stage though a second high pass filter, the second amplifier stage comprising a pnp common collector transistor having an npn emitter follower transistor buffering its collector output port.

5. The low power bar code reader detection circuit as in claim 4, wherein the digitizer circuit comprises:

a first amplifier coupled to the detected image signal input for tracking and holding the positive peaks of the detected image signal;

a second amplifier coupled to the detected image signal input for tracking and holding the negative peaks of the detected image signal;

a summing circuit connected to the output port of the first and second amplifiers for weighting and summing the output signals from the first and second amplifiers and producing a digital signal representing the detected bar code signal.

6. The low power bar code reader detection circuit as in claim 4, wherein the first amplifier stage conducts substantially only during the peak amplitudes of the detected image signal.

7. The low power bar code reader detection circuit as in claim 5, wherein a low pass filter is interposed between the output of the second amplifier stage and the input of the digitizer circuit for smoothing out modulation frequency components.

8. A bar code reader system comprising the detection circuit as in claim 5, wherein the oscillation circuit has pulses of no more than 3% duty cycle.

* * * * *